Feb. 4, 1941.    J. M. PEARSON    2,230,502
ELECTRICAL PROSPECTING METHOD AND APPARATUS
Filed Aug. 2, 1938
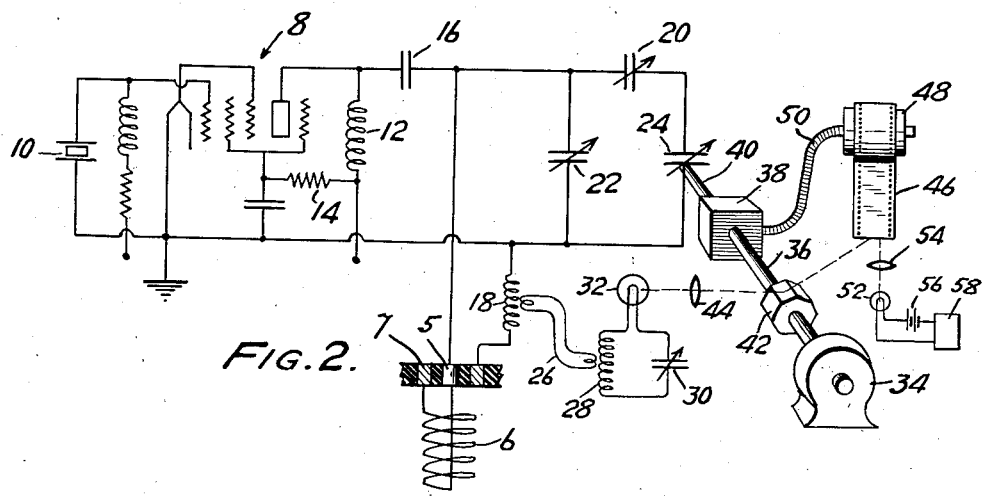
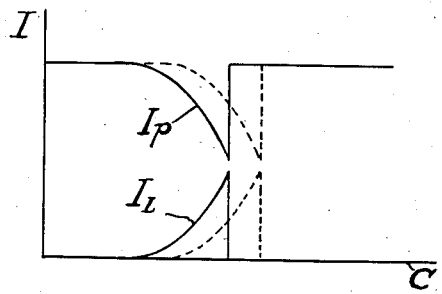
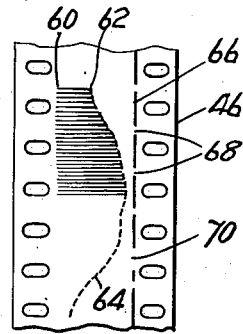
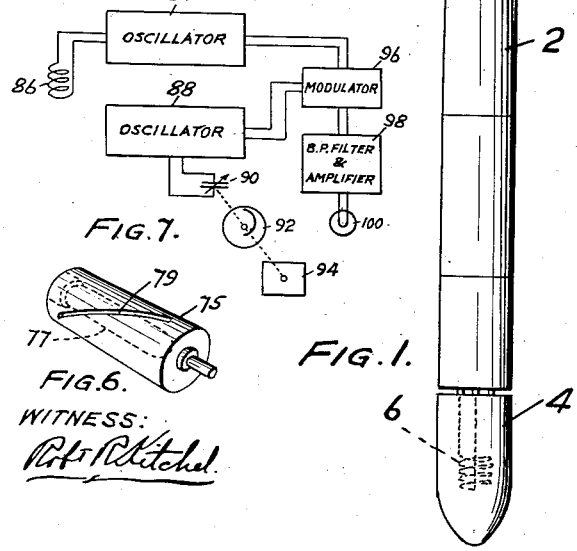
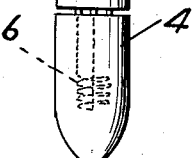
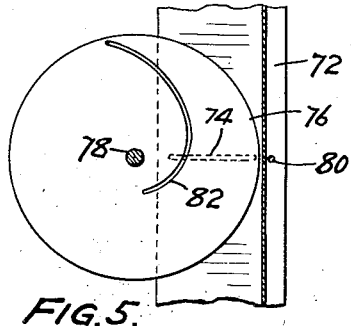
WITNESS:
INVENTOR
John M. Pearson
BY
ATTORNEYS.

Patented Feb. 4, 1941

2,230,502

UNITED STATES PATENT OFFICE 2,230,502

ELECTRICAL PROSPECTING METHOD AND APPARATUS

John M. Pearson, Swarthmore, Pa., assignor to Sperry-Sun Well Surveying Company, Philadelphia, Pa., a corporation of Delaware Application August 2, 1938, Serial No. 222,574

21 Claims. (Cl. 175—182)

This invention relates to geophysical prospecting and more specifically, by so-called electrical coring, to the determination of the nature and boundaries of formations traversed by bore holes.

The various formations which make up the portion of the crust of the earth which has been penetrated by bore holes vary quite considerably in their specific resistivities and dielectric constants. In view of this, proposals have been made to determine the location and nature of subterranean formations by producing high frequency electromagnetic fields in such fashions that they will be substantially affected by the presence of the formations under investigation. If a source giving rise to a high frequency electromagnetic field is located at or adjacent to the surface of the earth, and if the field is given the necessary spatial disposition, its characteristics measured by its reaction on the source or, alternatively, by suitable detectors located at different distances from the source, will give information from which deductions may be made as to the nature and location of subterranean formations.

In an application of Charles B. Bazzoni and Joseph Razek, Serial No. 72,246, filed April 2, 1936, now Patent #2,167,630 of Aug. 1, 1939, there are described a method and apparatus whereby records are made in a bore hole at a short distance from an electromagnetic field the variations of which, due to the presence of different formations in the vicinity of the source, are to be measured. More specifically, in accordance with the apparatus disclosed in said application, there is generated a high frequency electromagnetic field within the bore hole by means of an exploratory unit which may be lowered into the hole by means of a wire line or drill stem. The apparatus includes a suitable exciting element, which may take the form of an antenna or a coil, either of which is arranged so that a substantial part of its resulting electromagnetic field penetrates the formations through which the bore hole passes. In the case of an antenna, the dielectric constants and resistivities of the surrounding earth will vary its impedance and hence its reaction upon the generating circuit of which it forms a part. The major effects in the case of an antenna will be due to the different dielectric constants of the formations which are encountered. Likewise, if a coil is used, it will have an effective impedance depending primarily both upon the specific resistivities and dielectric constants of the formations lying within the portion of its field adjacent the coil. The varying impedance thus resulting as the apparatus traverses the bore hole will show itself in the generating circuit.

In the apparatus of said application, a crystal-controlled oscillator is preferably used, because of the major variations occurring in such a circuit with slight variations of the electrical characteristics of an exploratory circuit. For example, using a crystal for control purposes in the grid circuit, and having an exploratory coil in a tank circuit of the oscillator, a relatively slight change in the impedance of the tank circuit will correspond to the entire range of the oscillating condition of the circuit. Furthermore, the curve of tank current against impedance change or plate current against impedance change is not symmetrical, but shows a very sharp change from a condition of a maximum oscillation to a condition of impossibility of oscillation in the direction of increasing capacity in a resonant tank circuit.

It is the general object of the present invention to take advantage of this condition to provide an improvement in the method of recording in the type of apparatus described in said application. Specifically, this is accomplished by causing a critical type of oscillatory circuit, such as a crystal-controlled circuit, to pass repeatedly through periods of oscillation, making measurements of the condition of a varying impedance when oscillation abruptly starts or ceases in order to determine the variations of impedance of an exploratory portion of the oscillator circuit due to various formations in the bore hole.

This object, as well as more detailed objects relating to arrangements for securing the best records, will be apparent from the following description, read in conjunction with the following drawing in which:

Figure 1 is an exterior elevation of a protective casing and nosepiece of an instrument of the type herein described;

Figure 2 is a diagram illustrating the wiring of the apparatus together with certain of the mechanical elements thereof;

Figure 3 is a diagram showing the variations of plate current and high frequency load current with change of capacity in an oscillator tank circuit;

Figure 4 is a fragmentary view showing a developed film record secured by the use of the apparatus;

Figure 5 is a modified sweep arrangement for producing records in accordance with the invention;

Figure 6 is a perspective view showing an alternative type of sweep arrangement for producing records; and Figure 7 is a wiring diagram illustrating another embodiment of the invention.

The general requirements of an apparatus for securing records of strata by the use of high frequency are discussed in the Bazzoni and Razek application to which reference may be made for details. Briefly stated, there is lowered into the bore hole by means of a suitable cable a protective casing 2, which houses the generator of high frequency oscillations and preferably the recording apparatus, though it will be understood that records may be carried to the surface if a transmission line is feasible. Generally, this raises complications, and it is preferable to secure the records within the apparatus by which the high frequency field is produced. The protective casing 2 carries at its lower end a nosepiece 4 of substantially incompressible insulating material such as Bakelite, within which is molded an exploratory coil indicated at 6. Connection is made with the inside of the apparatus, preferably through a central conducting plug 5 and an annular ring 7 surrounding the plug and insulated from it, both the ring and the plug being insulated from the apparatus by being molded in a Bakelite or similar cap closing the protective casing against the extremely high pressures existing in a mud-filled bore hole. The arrangement just described for carrying the leads into the apparatus is desirable inasmuch as there is thereby avoided the inductance in the leads which may be present if the leads are independently carried through the steel of the casing.

Within the casing there is located a crystal-controlled oscillator and its power supplies, taking the form of batteries. The oscillator tube is indicated generally at 8, a crystal being located in conventional fashion in the grid circuit as indicated at 10. Instead of the crystal, if lower frequencies are desired, a magnetostrictive control may be used or, if ultra high frequencies are desired, the tuned transmission line type of control may be used, all of these serving to very sharply tune the oscillator circuit. However, even a not so critically tuned circuit may be used, an ordinary tuned plate-tuned grid oscillator giving fairly satisfactory results. It will be clear that various types of tubes may be used, though there is herein indicated a pentode the plate of which is fed through a choke coil 12, while the screen grid is fed through the same circuit with a voltage dropping resistor 14. The plate is coupled to the tank circuit through a large condenser 16.

The tank circuit connected between the condenser 16 and ground comprises the exploratory coil 6 and an additional loading coil 18 in parallel with a tank capacity constituted by the set of condensers 20, 22 and 24, connected as illustrated. The two coils in series are shunted by the condenser 22. The controlling condenser 24 is coupled in parallel with the condenser 22 through a condenser 20. This arrangement, as will be obvious, makes it possible to cause the condenser 24 to assume varying degrees of sensitivity in the control of the operation of the oscillator.

Coupled to the coil 18 through the inductive link 26, which may extend to a relatively remote location within the casing, is a resonant circuit comprising a coil 28 coupled to the link, a condenser 30, preferably variable for adjustment purposes, and a recording lamp 32 preferably having a low power consumption so as to impose little load upon the oscillator tank circuit. The lamp might, of course, be made part of the oscillator circuit, though this is not desirable because of the decreased sensitivity resulting therefrom. A loose coupling is desirable.

A motor 34 drives through a suitable reduction gearing a shaft 36, which in turn, through reduction gearing 38, drives the shaft 40 of the variable condenser 24. On the shaft 36 there is located a polygonal mirror 42 designed to project through the assistance of an optical system indicated at 44, an image of the lamp 32 upon a sensitized film 46, which is fed upon a reel 48 which may be driven by a shaft 50 from the reduction gearing 38. By reason of the rotation of the mirror 42, a point of light from the recording lamp 32 is swept transversely of the film 46, preferably lengthwise of a slit in a suitable mask (not shown). If the mirror 42 is octagonal, the condenser 44 is preferably given eight revolutions for each revolution of the shaft 36. In each revolution of the condenser, the capacity will be increasing during half a revolution and decreasing through the other half. Preferably, the parts are so arranged that the image of the lamp will be swept across the film during the entire time of increase of capacity or during any desired fraction thereof, at least to include, however, as indicated later, the capacities through which cessation of oscillations may occur. The arrangement may be such that the entire period of increase of capacity corresponds to the projection of the lamp image on the film, because, as indicated above, the sensitivity of the condenser 24 in effecting control may be adjusted by the relative manipulations of the condensers 20 and 22.

In addition to the images formed by the sweep arrangement just indicated, there is preferably simultaneously recorded on the film a series of time marks caused by the lamp 52, an image of the filament of which is projected on the film by a lens 54. The lamp 52 is in circuit with a battery 56 and a clockwork controlled switch 58, which may, for example, cause a momentary interruption of the lamp circuit every 20 seconds, with an extended interruption periodically, say every tenth interruption, to facilitate counting of the record. The depth of a record is determined by synchronization of the operation of switch 58 with a timepiece on the surface against which is checked the length of supporting cable paid out. Alternatively, depth indications may be sent from the surface as described in Bazzoni and Razek application Serial No. 222,609, filed August 2, 1938.

With an oscillator of the type illustrated in Figure 2, properly adjusted and having a crystal 10 or an equivalently sharply tuned device in its control circuit, oscillations will take place over only relatively limited adjustments of the tank circuit. The operation is typically represented in Figure 3, in which the abscissa is the capacity of the condenser 24. If the condenser is set at a low value at which oscillation does not occur, the plate current will assume a relatively high value as indicated by the left hand portion of the plate current curved marked $I_p$. As the capacity is increased, oscillation will begin with a gradual drop of the plate current until a minimum is reached corresponding to maximum power output and a tank current as indicated by the curve marked I_L. With a very slight increase of capacity beyond this point, however, oscillations suddenly cease and will not reoccur with increasing value of capacity. Since the current through the lamp is proportional to the tank current, it will be obvious that with increasing capacity the lamp will glow more and more brightly and then suddenly will be extinguished.

The above conditions, represented by the full line curves in Figure 3, will correspond to a fixed condition of the impedance of the coils 6 and 18 and the other condensers 20 and 22. In operation, all of these are of fixed impedance with the exception of the exploratory coil 6, which has a varying impedance depending upon its surroundings. If the impedance assumes a different value from that corresponding to the conditions represented by full line curves, the condition of oscillation may be shifted as indicated by the dotted lines, so that cessation of oscillation may occur only with an increased capacity of the condenser 24. Thus, the value of the capacity at the time oscillations cease will bear some relationship to the impedance conditions of the coil 6, and hence to the nature of the strata surrounding the coil, giving rise to its variations of impedance. By measuring the condenser positions at which operations cease, therefore, it is possible to secure a very sensitive record of the conditions about the coil 6. It may be remarked that in general numerical measurements are of no particular significance and that what is desired in electrical logging are the variations in operating conditions indicating changes of strata along the bore holes. Hence it is not generally necessary to calibrate the apparatus.

By utilizing the sweep arrangement illustrated in Figure 2, there is obtained the type of record illustrated in Figure 4. As the condenser capacity increases, oscillations begin at a position of the condenser which may correspond to a condition in which the spot of light is off the film. As the spot of light impinges upon the film at 60, oscillations may be occurring. It may be remarked that the beginning of oscillations is not particularly critical as the capacity is increased, so that the capacity value at the time of first illumination of the lamp may not accurately repeat itself. Furthermore, the oscillations are relatively weak at low capacity values and oscillation may be occurring while the lamp is glowing only faintly. As the spot sweeps across the film, the intensity of illumination of the lamp becomes greater and suddenly, at 62, the lamp will go out, oscillation having suddenly ceased. Thereafter, through the further increase of capacity of condenser 24 the film is not exposed. The condenser is then rotated through a condition of decreasing capacity when oscillations will again occur, but though the lamp now will light, the mirror will not project the spot on the film. Upon the succeeding revolutions of the condenser the same results occur and repeatedly suddenly ceasing streaks of light will pass across the film. If during such operations the apparatus is being lowered, the coil may pass through different strata, with the result that the impedance of the coil 6 changes and cessation of oscillations will occur with different condenser settings. Thus the successive exposure streaks will have different lengths, and if they overlap, as will generally be the case if the film is moving slowly, the ends of the streaks will have an envelope, as indicated at 64. The shape of this envelope will correspond with the characteristics of the formations encountered by the exploratory coil. In order to secure a record with the streaks close together or overlapping the mirror and condenser may be rotated at moderately high speeds. It is desirable only that the speeds should be sufficiently low that a sharp cut-off of the streaks is secured, since the lamp will continue to glow for minute fractions of a second after oscillations cease. With a small lamp having a very thin filament, however, the lamp is extinguished completely in a small fraction of a second, so that the boundaries of the record are sharp.

Simultaneously with the record just described, there are formed on the film timing marks indicated at 66, having small gaps 68 and periodic larger gaps 70. When the apparatus is assembled for lowering, one of the larger gaps may be synchronized with a timepiece at the surface. Thereafter a record is made of corresponding depths and times, either by automatic apparatus or by merely noting the depths reached at various times. The impedance record obtained on the film may then be correlated with the time and in turn with the depth, so that ultimately a log of the well giving strata conditions against depth may be plotted. Alternatively depth marks may be made by transmission from the surface.

While cessation of oscillations with increase of capacity has been particularly mentioned, it will be clear that the beginning of oscillations with decrease of capacity may be equally recorded, since the onset of oscillations with capacity decrease also occurs quite suddenly. It will also be obvious that instead of varying a capacity an inductance in the tank circuit may be periodically varied, in which case there will also be secured an asymmetrical curve of tank current with change of impedance. The steep sides of this curve may be used when it represents either the cessation or beginning of oscillations.

Various matters referred to in the said Bazzoni and Razek application may be taken into account in this apparatus. For example, an antenna may be used in place of the exploratory coil, the crystal temperature may be controlled in order that checking records may be secured in going into and coming out of the bore hole. Telemetering apparatus may be provided for signalling to the surface, or even to a relatively remote portion of the apparatus. For example, another oscillator may be made to beat with the output of the type of oscillator shown in Figure 2 and cessation of the beat note may be recorded. Or a thermocouple heated by the tank current may have its current transmitted to the surface. In either case, the instantaneous condenser value may be transmitted or rendered known, for example, by drive by a motor synchronized with one at the surface. Multiple recording may be accomplished on a single film, as described in the said Bazzoni and Razek application.

The sweep circuit may also take other forms, as, for example, that illustrated in Figure 5. In this case, a mask 72 for the film may be provided with a transverse slit 74. In front of this there rotates a disc 76 mounted on a shaft 78 serving to drive the condenser 24. A spiral slit 82 is provided in this disc, and a lamp corresponding to 32 may be located in such fashion as to project a beam through the small opening provided at the overlapping of the slits 74 and 82. If the slit 82 extends about 180° of the shaft 78, corresponding in its intersection with the slit 74

74 with the increasing of the capacity of the condenser 24, the same type of record as that illustrated in Figure 4 will be provided, since the opening provided by the intersection will sweep rapidly across the film, which may be uniformly slowly moved, as in the case of the preceding modification. Instead of the disc a cylinder 75 housing a lamp 77 and provided with slits 79 may be used as illustrated in Fig. 6. A small opening 80, shielded from the recording lamp and through which the beam from a lamp such as 52 may pass, may provide the timing trace of the same type as that illustrated in Figure 4.

Instead of utilizing a lamp 32 taking current from the tank circuit, it will be noted that the illumination may be provided in various ways. For example, a lamp may be provided in another position in the apparatus, for example, in the grid circuit. Alternatively, a continuously illuminated lamp may be provided and its image caused to fall on a rotating mirror or upon a slit intersection of the type illustrated in Figure 5, only when oscillations are taking place by reflection from the mirror of a galvanometer or the like, which is responsive to conditions of oscillation, for example, a decrease in the plate current.

The sharply defined event which is used as the indication of the nature of the strata which is traversed need not necessarily be the beginning or ending of oscillations of the oscillator which propagates the high frequency oscillations into the earth. It is well known, for example, that oscillators may be made capable of oscillating at two different frequencies, depending upon the condition of adjustment of some part or parts thereof. In such adjustment, the transition from oscillation of one frequency to oscillation at another frequency will be quite sharp. For example, if a condition of oscillating at two frequencies be used for control of an oscillator such as that of Figure 2, or alternatively, if two crystals which are different be used, the adjustment of a condenser such as 24 may result in a sudden change of the frequency of oscillation, while oscillation is nevertheless maintained before and after such change of frequency. In the use of such an apparatus, therefore, a recording lamp or the like may be made responsive (by means of a wave meter circuit) to one frequency and not to the other, so that the transition will be sharply indicated.

Alternatively, other sharply defined changes of condition may be produced in connection with an oscillating circuit. As an example, an apparatus such as that illustrated in Figure 7 may be adopted. This comprises an oscillator 84 having as part of its tank circuit (or grid circuit) an exploratory coil 86, the oscillator being not of a fixed frequency type, but of a type which may have a variable frequency depending upon the impedance of the coil 86 as it passes through different strata. In the apparatus of Figure 7, there is provided a second oscillator 88 which is also capable of producing different frequencies depending upon the capacity of a condenser 90, which may be included in one of its controlling circuits, the condenser being rotated by means of a motor and reduction gearing 94 in synchronism with a scanning disc 92 of the type illustrated in Figure 5. The outputs of the two oscillators are fed into a modulator 96 from which a beat frequency is fed to a band pass filter and amplifier 98, the filter being of such type as to have a sharp cut-off at either the uppermost or lowermost frequency of the band which it passes. The output of this amplifier is arranged to illuminate a lamp 100.

In the operation of this device of Figure 7, the frequency of the oscillator 84 will vary depending upon the strata through which the exploratory coil passes. Simultaneously, the condenser 90 is being periodically driven through maximum and minimum capacities definitely related to the angular position of the shaft and the intersection of the scanning slot in the disc 92 with a slot extending transversely of the film as indicated in Figure 5. The beat frequency of the two oscillators will be passed by the filter-amplifier 98 only when the beat frequency falls within the pass band. It will be obvious that as the frequency of oscillator 84 varies the upper or lower frequency limit of the band pass filter will be reached at different angular positions of the shaft of the condenser 90, and consequently the lamp 100 will be either illuminated or extinguished quite sharply at different angular positions of the condenser shaft depending upon the impedance of the coil 86. Since the filter may be made with a sharp cut-off, it will be clear that the attainment by the oscillator of different frequencies will be very sharply indicated by the recording mechanism. All of the apparatus of Figure 7, together with its power supplies is, of course, included in a casing in the same fashion as the apparatus of Figure 2, the mechanical details being similar to those of the modifications of Figures 2 and 5.

Other variations in the apparatus within the scope of the invention will be readily apparent to those skilled in the art.

The apparatus may be monitored in the general fashion set forth in the Bazzoni and Razek application Serial No. 222,609 filed August 2, 1938, mentioned above; i. e., the various adjustments of the apparatus may be made after assembly in its protective casing, motors being provided to adjust the condensers 20 and 22, and indications of proper operation being carried to the exterior of the apparatus by photocells, microphones, thermocouples or the like.

What I claim and desire to protect by Letters Patent is:

1. Means for determining the location and character of formations penetrated by a bore hole comprising an exploring unit; said exploring unit including a generator of high frequency oscillations, means for establishing thereby an electromagnetic field penetrating formations in the vicinity of the bore hole, said last named means forming a part of the generator circuit, means responsive to variations in operation of the generator circuit due to change of impedance of the field establishing means resulting from different materials in the vicinity thereof, the generator including an impedance variable through a value determining a limit, dependent upon the impedance of the field establishing means, of the operative condition of the generator, and means for varying the variable impedance, said responsive means comprising a device indicative of the existence or nonexistence of oscillations; and means for supporting said unit for movement within and lengthwise of the bore hole.

2. Means for determining the location and character of formations penetrated by a bore hole comprising an exploring unit; said exploring unit including a generator of high frequency oscillations, means for establishing thereby an electromagnetic field penetrating formations in the vicinity of the bore hole, said last named means forming a part of the generator circuit, means responsive to variations in operation of the generator circuit due to change of impedance of the field establishing means resulting from different materials in the vicinity thereof, the generator including an impedance variable through a value determining a limit, dependent upon the impedance of the field establishing means, of the operative condition of the generator, and means for varying the variable impedance, said responsive means comprising a device indicative of the existence or nonexistence of oscillations; means for supporting said unit for movement within and lengthwise of the bore hole; and means for indicating the relationship of the indications of said device and the value of said variable impedance.

3. Means for determining the location and character of formations penetrated by a bore hole comprising an exploring unit; said exploring unit including a generator of high frequency oscillations, means for establishing thereby an electromagnetic field penetrating formations in the vicinity of the bore hole, said last named means forming a part of the generator circuit, means responsive to variations in operation of the generator circuit due to change of impedance of the field establishing means resulting from different materials in the vicinity thereof, the generator including means variable through a value determining a limit, dependent upon the impedance of the field establishing means, of the operative condition of the generator, and means for varying said variable means, said responsive means comprising a device indicative of the existence or nonexistence of oscillations; and means for supporting said unit for movement within and lengthwise of the bore hole.

4. Means for determining the location and character of formations penetrated by a bore hole comprising an exploring unit; said exploring unit including a generator of high frequency oscillations, means for establishing thereby an electromagnetic field penetrating formations in the vicinity of the bore hole, said last named means forming a part of the generator circuit, means responsive to variations in operation of the generator circuit due to change of impedance of the field establishing means resulting from different materials in the vicinity thereof, the generator including means variable through a value determining a limit, dependent upon the impedance of the field establishing means, of the operative condition of the generator, and means for varying said variable means, said responsive means comprising a device indicative of the existence or nonexistence of oscillations; means for supporting said unit for movement within and lengthwise of the bore hole; and means for indicating the relationship of the indications of said device and the value of said variable means.

5. Means for determining the location and character of formations penetrated by a bore hole comprising en exploring unit; said exploring unit including a generator of high frequency oscillations, means for establishing thereby an electromagnetic field penetrating formations in the vicinity of the bore hole, said last named means forming a part of the generator circuit, means responsive to variations in operation of the generator circuit due to change of impedance of the field establishing means resulting from different materials in the vicinity thereof, and means for periodically substantially modifying the operation of the generator at different phase conditions of the modifying means dependent upon the impedance of the field establishing means, and said responsive means comprising a device indicative of said substantial modification of the operation of the generator; and means for supporting said unit for movement within and lengthwise of the bore hole.

6. Means for determining the location and character of formations penetrated by a bore hole comprising an exploring unit; said exploring unit including a generator of high frequency oscillations, means for establishing thereby an electromagnetic field penetrating formations in the vicinity of the bore hole, said last named means forming a part of the generator circuit, means responsive to variations in operation of the generator circuit due to change of impedance of the field establishing means resulting from different materials in the vicinity thereof, and means for periodically substantially modifying the operation of the generator at different phase conditions of the modifying means dependent upon the impedance of the field establishing means, and said responsive means comprising a device indicative of said substantial modification of the operation of the generator; means for supporting said unit for movement within and lengthwise of the bore hole; and means for indicating the relationship of the indications of said device and the phase condition of said modifying means.

7. Means for determining the location and character of formations penetrated by a bore hole comprising an exploring unit; said exploring unit including a generator of high frequency oscillations, means for establishing thereby an electromagnet field penetrating formations in the vicinity of the bore hole, said last named means forming a part of the generator circuit, and means responsive to variations in operation of the generator circuit due to changes of impedance of the field establishing means resulting from different materials in the vicinity thereof, said responsive means including a periodically operating scanning means, and means varied periodically in timing with the scanning means and cooperating with said generator to give indications varying in phase relationship with the scanning means in accordance with changes of impedance of the field establishing means; and means for supporting said unit for movement within and lengthwise of the bore hole.

8. Means for determining the location and character of formations penetrated by a bore hole comprising an exploring unit; said exploring unit including a generator of high frequency oscillations, and means for establishing thereby an electromagnetic field penetrating formations in the vicinity of the bore hole, said last named means forming a part of the generator circuit; means for supporting said unit for movement within and lengthwise of the bore hole; and means responsive to variations in operation of the generator circuit due to changes of impedance of the field establishing means resulting from different materials in the vicinity thereof; said responsive means including a periodically operating scanning means, and means varied periodically in timing with the scanning means and cooperating with said generator to give indications varying in phase relationship with the scanning means in accordance with changes of impedance of the field establishing means.

9. Means for determining the location and character of formations penetrated by a bore hole comprising means for establishing an electromagnetic field penetrating formations in the vicinity of the bore hole, means for supporting the field establishing means for movement within and lengthwise of the bore hole, a generator of high frequency oscillations supplying said field establishing means, and means responsive to variations in operation of the generator circuit due to change of impedance of the field establishing means resulting from different materials in the vicinity thereof; said responsive means including a periodically operating scanning means, and means varied periodically in timing with the scanning means and cooperating with said generator to give indications varying in phase relationship with the scanning means in accordance with changes of impedance of the field establishing means.

10. Means for determining the location and character of formations penetrated by a bore hole comprising means for establishing an electromagnetic field penetrating formations in the vicinity of the bore hole, means for supporting the field establishing means for movement within and lengthwise of the bore hole, a generator of high frequency oscillations supplying said field establishing means, and means responsive to change of impedance of the field establishing means resulting from different materials in the vicinity thereof; said responsive means including a periodically operating scanning means and means giving indications varying in phase relationship with the scanning means in accordance with changes of impedance of the field establishing means.

11. Means for determining the location and character of formations penetrated by a bore hole comprising means for establishing electrical currents in the formations in the vicinity of the bore hole, means for supporting the establishing means for movement within and lengthwise of the bore hole, means for supplying current to said establishing means, and means responsive to changes of electrical characteristics of the formations encountered by said establishing means; said responsive means including a periodically operating scanning means and means giving indications varying in phase relationship with the scanning means in accordance with such changes of electrical characteristics, the frequency of the scanning being independent of said electrical currents.

12. The method of determining the location and character of formations penetrated by a bore hole comprising locally establishing electrical currents in the formations in the vicinity of the bore hole, moving the establishing means lengthwise of the bore hole, periodically scanning indications resulting from the existence of said electrical currents and varying in phase relationship with the scanning in accordance with changes of electrical characteristics of the formations encountered by said locally established electrical currents, and recording the phase relationship of such indications with respect to the scanning, the frequency of the scanning being independent of said electrical currents.

13. The method of determining the location and character of formations penetrated by a bore hole comprising locally establishing electrical currents in the formations in the vicinity of the bore hole, moving the establishing means lengthwise of the bore hole, periodically scanning indications resulting from the existence of said electrical currents and varying with the phase of the scanning and in accordance with changes of electrical characteristics of the formations encountered by said locally established electrical currents, and recording such indications, the frequency of the scanning being independent of said electrical currents.

14. The method of determining the location and character of formations penetrated by a bore hole comprising locally establishing a high frequency electromagnetic field in the formations in the vicinity of the bore hole, moving the establishing means lengthwise of the bore hole, periodically scanning indications resulting from the existence of said field and varying with the phase of the scanning and in accordance with changes of electrical characteristics of the formations encountered by said field, and recording such indications, the scanning and field frequencies being different.

15. The method of determining the location and character of formations penetrated by a bore hole comprising establishing electrical currents in the formations in the vicinity of the bore hole, periodically scanning indications resulting from the existence of said currents and varying with the phase of the scanning and in accordance with changes of electrical characteristics of the formations along the bore hole, and recording such indications, the frequency of the scanning being independent of said electrical currents.

16. Means for determining the location and character of formations penetrated by a bore hole comprising means for establishing electrical currents in the formations in the vicinity of the bore hole, and means responsive to changes of electrical characteristics of the formations along the bore hole; said responsive means including a periodically operating scanning means, and means giving indications varying with the phase of the scanning and in accordance with such changes of electrical characteristics, the frequency of the scanning being independent of said electrical currents.

17. The method of determining the location and character of formations penetrated by a bore hole comprising establishing alternating currents in the formations in the vicinity of the bore hole, periodically scanning indications resulting from the existence of said currents and varying with the phase of the scanning and in accordance with changes of electrical characteristics of the formations along the bore hole, and recording such indications, the scanning and alternating current frequencies being different.

18. Means for determining the location and character of formations penetrated by a bore hole comprising means for establishing alternating currents in the formations in the vicinity of the bore hole, and means responsive to changes of electrical characteristics of the formations along the bore hole; said responsive means including a periodically operating scanning means, and means giving indications varying with the phase of the scanning and in accordance with such changes of electrical characteristics, the scanning and alternating current frequencies being different.

19. Means for determining the location and character of formations penetrated by a bore hole comprising means for establishing electrical currents in the formations in the vicinity of the bore hole, and means responsive to changes of electrical characteristics of the formations along the bore hole; said responsive means including a periodically operating scanning means, and means giving indications varying in intensity with the phase of the scanning and in accordance with such changes of electrical characteristics.

20. Means for determining the location and character of formations penetrated by a bore hole comprising means for establishing electrical currents in the formations in the vicinity of the bore hole, and means responsive to changes of electrical characteristics of the formations along the bore hole; said responsive means including a periodically operating scanning means, and means giving indications varying sharply with the phase of the scanning and in accordance with such changes of electrical characteristics.

21. Means for determining the location and character of formations penetrated by a bore hole comprising means for establishing electrical currents in the formations in the vicinity of the bore hole, and means responsive to changes of electrical characteristics of the formations along the bore hole; said responsive means including a periodically operating scanning means, means giving indications varying with the phase of the scanning and in accordance with such changes of electrical characteristics, and means for recording said indications transversely of a strip in the form of a line for each scanning period, the lines for successive periods being side by side lengthwise of the strip.

JOHN M. PEARSON.